United States Patent
Choi et al.

(10) Patent No.: US 12,487,753 B2
(45) Date of Patent: Dec. 2, 2025

(54) MEMORY DEVICE AND OPERATING METHOD THEREOF

(71) Applicant: SK hynix Inc., Icheon-si (KR)

(72) Inventors: Gil Bok Choi, Icheon-si (KR); Dae Hwan Yun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 21 days.

(21) Appl. No.: 18/309,637

(22) Filed: Apr. 28, 2023

(65) Prior Publication Data

US 2024/0160358 A1    May 16, 2024

(30) Foreign Application Priority Data

Nov. 10, 2022 (KR) .................. 10-2022-0149941

(51) Int. Cl.
*G06F 3/06* (2006.01)

(52) U.S. Cl.
CPC ............ *G06F 3/0619* (2013.01); *G06F 3/064* (2013.01); *G06F 3/0659* (2013.01); *G06F 3/0673* (2013.01)

(58) Field of Classification Search
CPC ...... G06F 3/064; G06F 3/0619; G06F 3/0659; G06F 3/0673
USPC ......................................................... 711/154
See application file for complete search history.

(56) References Cited

U.S. PATENT DOCUMENTS

| | | | |
|---|---|---|---|
| 2005/0128815 A1* | 6/2005 | Ishikawa | G11C 16/16 365/185.29 |
| 2010/0064096 A1* | 3/2010 | Weingarten | G06F 12/0246 711/170 |
| 2012/0137048 A1* | 5/2012 | Cho | G11C 16/3404 711/E12.008 |
| 2013/0248977 A1* | 9/2013 | Mori | H10D 62/832 257/326 |
| 2014/0286105 A1* | 9/2014 | Lin | G11C 11/5642 365/185.24 |
| 2020/0111535 A1* | 4/2020 | Han | G11C 16/16 |
| 2020/0393973 A1* | 12/2020 | Reusswig | G11C 16/349 |
| 2021/0035635 A1* | 2/2021 | Yoon | G11C 13/0028 |
| 2023/0189528 A1* | 6/2023 | Song | H10B 43/35 257/314 |

FOREIGN PATENT DOCUMENTS

| KR | 1020150109120 A | 10/2015 |
|---|---|---|
| KR | 101944798 B1 | 2/2019 |

* cited by examiner

*Primary Examiner* — Yaima Rigol
(74) *Attorney, Agent, or Firm* — WILLIAM PARK AND ASSOCIATES LTD.

(57) ABSTRACT

A memory device performs a detrap operation on a selected memory block when the number of program/erase cycles of the selected memory block equals or exceeds a predetermined set number. A circuit included in the memory device applies a heating current to a heating layer, thermally coupled to the channel of each of the plurality of strings included in the selected memory block in the detrap operation.

20 Claims, 13 Drawing Sheets

MEMORY DEVICE AND OPERATING METHOD THEREOF

CROSS-REFERENCE TO RELATED APPLICATION

The present application claims priority under 35 U.S.C. § 119(a) to Korean patent application number 10-2022-0149941, filed on Nov. 10, 2022, in the Korean Intellectual Property Office, the entire disclosure of which is incorporated herein by reference.

BACKGROUND

1. Technical Field

The present disclosure generally relates to an electronic device, and more particularly, to a memory device and an operating method thereof.

2. Related Art

The paradigm on recent computer environment has been turned into ubiquitous computing environment in which computing systems can be used anywhere and anytime. This promotes increasing usage of portable electronic devices such as mobile phones, digital cameras, notebook computers, and the like. Such portable electronic devices may generally include a memory system using a memory device, i.e., a data storage device. The data storage device is used as a main memory device or an auxiliary memory device of the portable electronic devices.

A data storage device using a memory device has excellent stability and durability, high information access speed, and low power consumption, since there is no mechanical driving part. In an example of memory systems having such advantages, the data storage device includes a Universal Serial Bus (USB) memory device, memory cards having various interfaces, a Solid State Drive (SSD), and the like.

SUMMARY

Embodiments provide a memory device capable of improving a retention characteristic of memory cells, and an operating method of the memory device.

In accordance with an aspect of the present disclosure, there is provided a memory device including: a plurality of memory blocks each block including a plurality of strings; a peripheral circuit configured to perform a program operation, a read operation, and an erase operation on a selected memory block among the plurality of memory blocks; and a control logic configured to count a program/erase number of each of the plurality of memory blocks, and control the peripheral circuit to perform a detrap operation of the selected memory block when the program/erase number of the selected memory block exceeds a set number, wherein the peripheral circuit applies a heating current to a channel of each of the plurality of strings included in the selected memory block in the detrap operation.

In accordance with another aspect of the present disclosure, there is provided a method of operating a memory device, the method including: performing a general operation of a selected memory block; determining whether a program/erase number of the selected memory block exceeds a set number; and performing a detrap operation by applying a heating current to a channel of each of a plurality of memory strings included in the selected memory block when the program/erase number of the selected memory block exceeds the set number.

In accordance with still another aspect of the present disclosure, there is provided a memory device including: a memory cell array including a plurality of memory blocks each including a plurality of strings; a peripheral circuit configured to perform a program operation, a read operation, an erase operation, and a detrap operation on a selected memory block among the plurality of memory blocks; a heating current generating circuit configured to apply a first heating current to the selected memory block in the detrap operation; and a control logic configured to count a program/erase number of the selected memory block, and control the peripheral circuit and the heating current generating circuit to perform the detrap operation on the selected memory block when the program/erase number of the selected memory block exceeds a set number.

In accordance with still another aspect of the present disclosure, there is provided a method of operating a memory device, the method including: performing a general operation of a memory block including a plurality of strings, wherein each of the plurality of strings has a channel structure including a heating layer, a channel layer, a tunnel insulating layer, and a charge storage layer; determining whether a program/erase number of the memory block exceeds a set number; and performing a detrap operation by applying a heating current to the heating layer and the channel layer of each of the plurality of strings included in the memory block when the program/erase number of the memory block exceeds the set number.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, exemplary embodiments of the present disclosure will be described in detail with reference to the accompanying drawings in order for those skilled in the art to be able to readily implement the technical spirit of the present disclosure.

Figure 1:
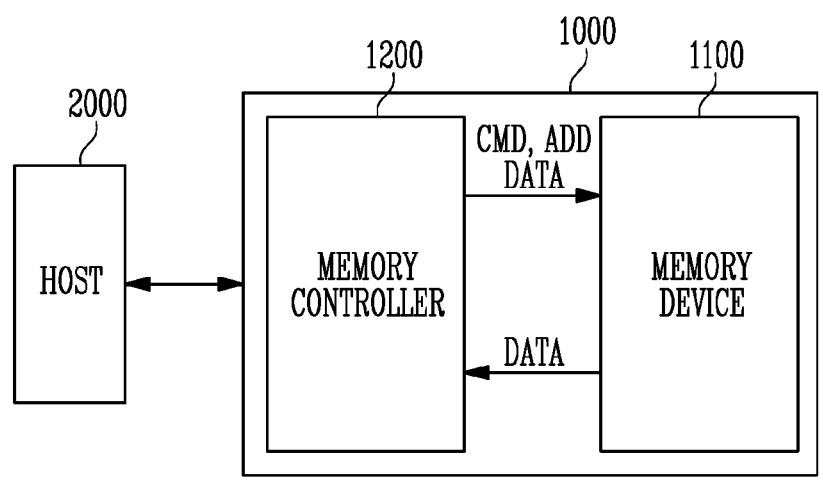
FIG. 1 is a diagram illustrating a memory system in accordance with an embodiment of the present disclosure.

FIG. 1 is a diagram illustrating a memory system in accordance with an embodiment of the present disclosure.

Referring to FIG. 1, the memory system 1000 may include a memory device 1100 configured to store data and a memory controller 1200 configured to control the memory device 1100 under the control of a host 2000.

The host 2000 may communicate with the memory system 1000 by using an interface protocol such as Peripheral Component Interconnect-Express (PCI-E), Advanced Technology Attachment (ATA), Serial ATA (SATA), Parallel ATA (PATA), or Serial Attached SCSI (SAS). In addition, the interface protocol between the host 2000 and the memory system 1000 are not limited to the above-described example, and may be one of other interface protocols such as a Universal Serial Bus (USB), a Multi-Media Card (MMC), an Enhanced Small Disk Interface (ESDI), and an Integrated Drive Electronics (IDE).

The memory controller 1200 may control overall operations of the memory system 1000, and control data exchange between the host 2000 and the memory device 1100. For example, the memory controller 1200 may control the memory device 1100 to program or read data according to a request of the host 2000. In a program operation, the memory controller 1200 may transmit, to the memory device 1100, a command CMD corresponding to the program operation, an address ADD, and data DATA to be programmed. Also, in a read operation, the memory controller 1200 may receive and temporarily store data DATA read from the memory device 1100, and transmit the temporarily stored data DATA to the host 2000.

The memory device 1100 may perform a program, read or erase operation under the control of the memory controller 1200. The memory device 1100 in accordance with the embodiment of the present disclosure may perform a detrap operation by applying a heating current to a channel of memory cells included in the memory device 1100, when the number of program/erase operations exceeds a predetermined or set number of operations, the number being user-specified. When the heating current having a current amount greater than a set current amount is applied to the channel of the memory cells, heat is generated in the channel, and electrons trapped in a trap site of the memory cells may be liberated or released or "detrapped" by the generated heat. In accordance with another embodiment, the memory device 1100 may perform the detrap operation just after an erase operation of a selected memory block, which is performed subsequently, when a number of memory cells in which a fail occurs in a program operation of the selected memory block exceeds a set number.

In some embodiments, the memory device 1100 may include a Double Data Rate Synchronous Dynamic Random Access Memory (DDR SDRAM), a Low Power Double Data Rate4 (LPDDR4) SDRAM, a Graphics Double Data Rate (GDDR) SDRAM, a Low Power DDR (LPDDR), a Rambus Dynamic Random Access Memory (RDRAM), or a flash memory.

Figure 2:
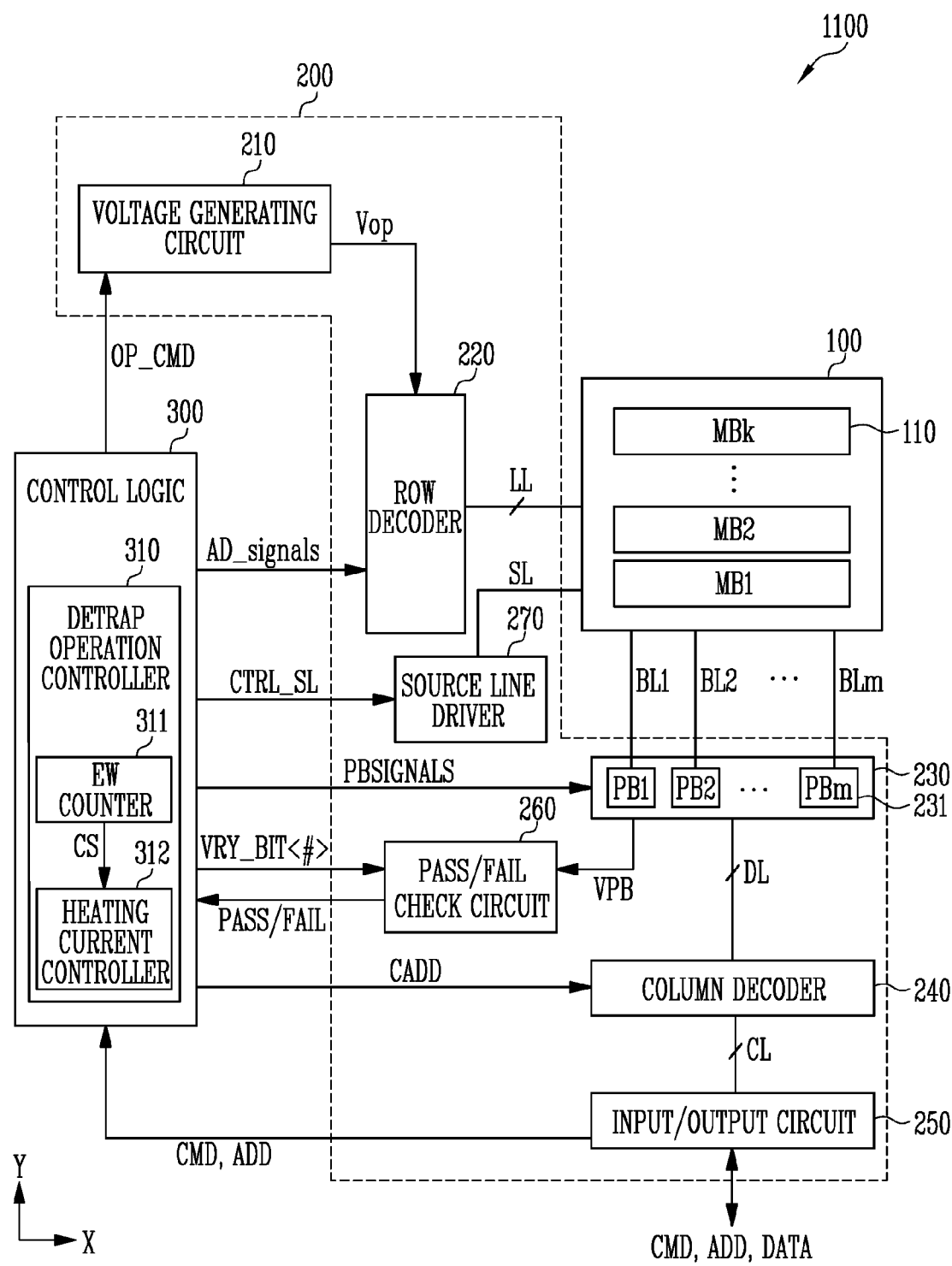
FIG. 2 is a diagram illustrating a first embodiment of a memory device shown in FIG. 1.

FIG. 2 is a diagram illustrating a first embodiment of the memory device shown in FIG. 1.

Referring to FIG. 2, the memory device 1100 may include a memory cell array 100 in which data can be stored. The memory device 1100 may include a peripheral circuit 200 configured to perform a program operation for storing data in the memory cell array 100, a read operation for outputting stored data, and an erase operation for erasing stored data. The memory device 1100 may include a control logic 300 which controls the peripheral circuit 200 under the control of the memory controller (1200 shown in FIG. 1).

The memory cell array 100 may include a plurality of memory blocks MB1 to MBk 110 (k is a positive integer). Local lines LL and the bit lines BL1 to BLm (m is a positive integer) may be connected to each of the memory blocks MB1 to MBk 110. For example, the local lines LL may include a first select line, a second select line, and a plurality of word lines arranged between the first and second select lines. Also, the local lines LL may include dummy lines arranged between the first select line and the word lines and between the second select line and the word lines. The first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be connected to each of the memory blocks MB1 to MBk 110, and the bit lines BL1 to BLm may be commonly connected to the memory blocks MB1 to MBk 110. The memory blocks MB1 to MBk 110 may be implemented in a two-dimensional or three-dimensional structure. For example, memory cells may be arranged in a direction parallel to a substrate in the memory blocks 110 having the two-dimensional structure. For example, memory cells may be stacked in a direction vertical to a substrate in the memory blocks 110 having the three-dimensional structure.

The peripheral circuit 200 may be configured to perform program, read, and erase operations of a selected memory block 110 under the control of the control logic 300. For example, the peripheral circuit 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop used for program, read, and erase operations in response to an operation signal OP_CMD.

The row decoder 220 may transfer the operating voltages Vop to the local lines LL connected to the selected memory block 110 in response to row decoder control signals AD_signals. For example, in a program operation, the row decoder 220 may apply a program operation voltage generated by the voltage generating circuit 210 to word lines of the selected memory block in response to the row decoder control signals AD_signals. Also, in a read operation, the row decoder 220 may apply a read operation voltage generated by the voltage generating circuit 210 to the word lines of the selected memory block in response to the row decoder control signals AD_signals.

The page buffer group 230 may include a plurality of page buffers PB1 to PBm 231 connected to the bit lines BL1 to BLm. The page buffers PB1 to PBm 231 may be operated in response to page buffer control signals PBSIGNALS. For example, in a program operation, the page buffers PB1 to PBm 231 may temporarily store data to be programmed and control a potential level of the bit lines BL1 to BLm, based on the temporarily stored data to be programmed. Also, in a detrap operation, the page buffer group 230 may apply a heating current to the bit lines BL1 to BLm under the control of the control logic 300. The heating current may have a current amount greater than a set amount.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are transferred from the memory controller (1200 shown in FIG. 1), to the control logic 300, or exchange data DATA with the column decoder 240.

In a program verify operation, the pass/fail check circuit 260 may generate a reference current in response to an allow bit VRY_BIT<#>, and output a pass signal PASS or a fail signal FAIL by comparing a sensing voltage VPB received from the page buffer group 230 with a reference voltage generated by the reference current. The sensing voltage VPB may be a voltage controlled based on a number of memory cells determined as a pass in the program verify operation. Also, the pass/fail check circuit 260 may generate a program fail bit number by counting a number of memory cells determined as a fail, based on a result of the program verify operation, and transmit the program fail bit number to the control logic 300.

The source line driver 270 may be connected to a memory cell included in the memory cell array 100 through the source line SL, and control a voltage applied to the source line SL. The source line driver 270 may receive a source line control signal CTRL_SL from the control logic 300, and control a source line voltage applied to the source line SL, based on the source line control signal CTRL_SL. Also, in a detrap operation, the source line driver 270 may apply a heating current to the source line SL under the control of the control logic 300. The heating current may have a current amount greater than a set amount.

The control logic 300 may control the peripheral circuit 200 by outputting the operation signal OP_CMD, the row decoder control signals AD_signals, the page buffer control signals PBSIGNALS, and the allow bit VRY_BIT<#> in response to the command CMD and the address ADD.

The control logic 300 may include a detrap operation controller 310. The detrap operation controller 310 may count a program/erase operation number of each of the plurality of memory blocks MB1 to MBk 110 included in the memory cell array 100, and control the peripheral circuit 200 to perform a detrap operation on a memory block of which program/erase operation number exceeds a set number among the plurality of memory blocks MB1 to MBk 110.

The detrap operation controller 310 may include an EW counter 311, which counts program/erase operations. The detrap operation controller 310 may also include a heating current controller 312.

The EW counter 311 may count the number of program/erase operations for each of the plurality of memory blocks MB1 to MBk 110 included in the memory cell array 100, and compare the counted program/erase operation number for each of the plurality of memory blocks MB1 to MBk 110 with a pre-determined, i.e., user-specified set number of program/erase operations. In one embodiment, when the set number of program/erase operations is reached, the EW counter 311 may generate and output a counting signal CS for a memory block, which indicates that the number of program/erase operations exceeds, (or in other embodiments, when the program/erase operation number is equal to) the set number, for any one of memory blocks MB1 to MBk 110.

The heating current controller 312 may determine whether any memory block of which program/erase operation number exceeds the set number exists, based on the counting signal CS, thereby determining whether the detrap operation is to be performed. For example, when it is determined that a memory block of which program/erase operation number exceeds the set number exists, based on the counting signal CS, the heating current controller 312 may control the page buffer group 230 or the source line driver 270 to apply a heating current to the bit lines BL1 to BLm or the source line SL, and control the row decoder 230 such that the heating current applied to the bit lines BL1 to BLm or the source line SL is applied to channels of the memory block of which program/erase operation number exceeds the set number.

Figure 7:
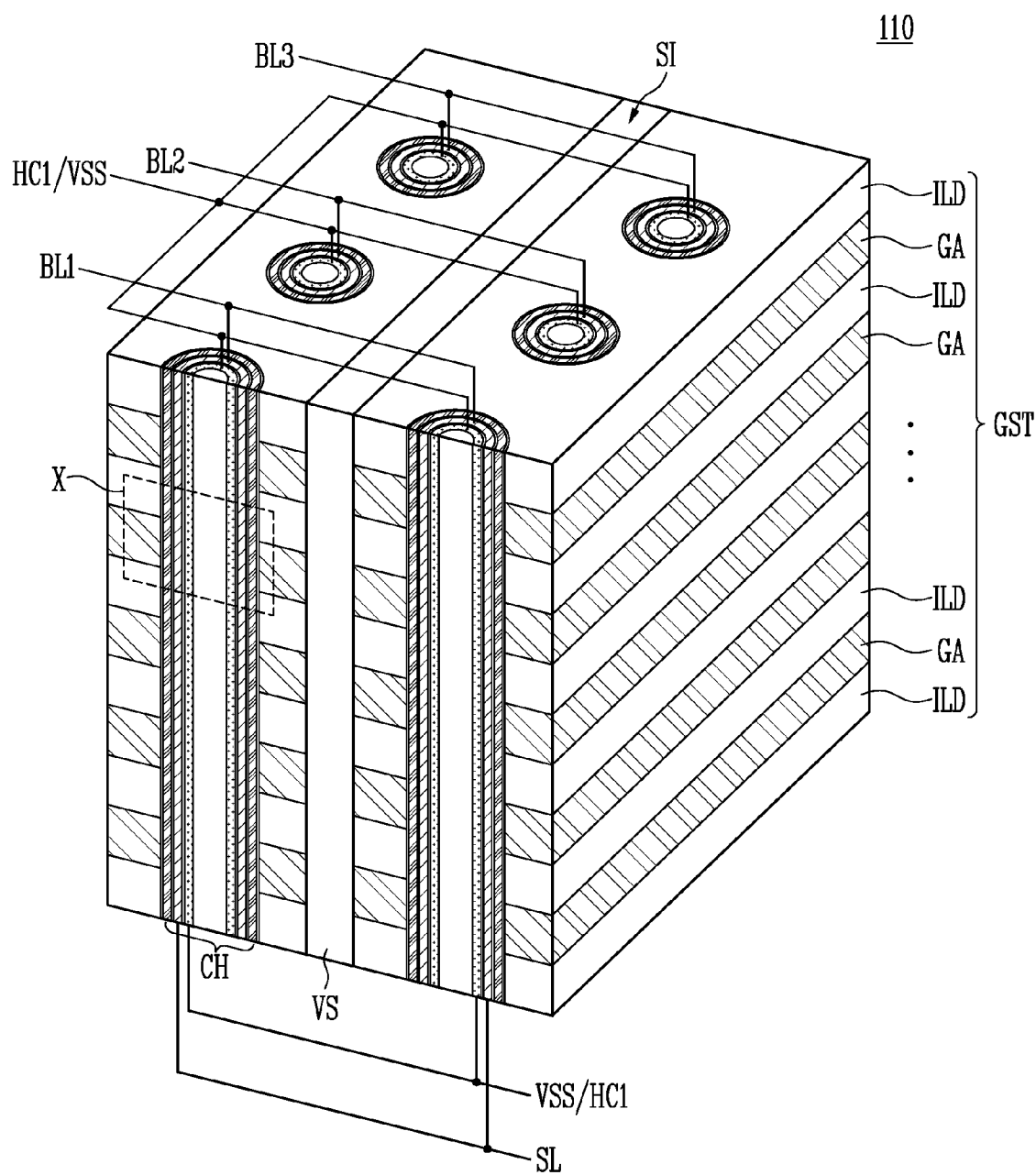
FIG. 7 is a perspective view illustrating an internal structure of strings included in the memory block shown in FIG. 5.
Figure 8:
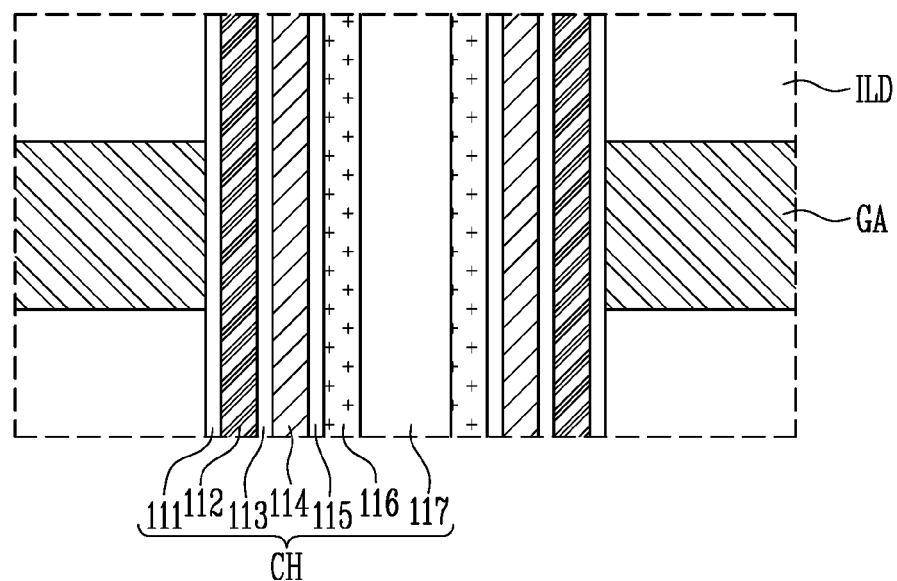
FIG. 8 is an enlarged sectional view of area X shown in FIG. 7.

In the detrap operation, heat is generated in a selected memory block of which program/erase operation number exceeds the set number by a heating current applied to a heating layer, which as shown in FIGS. 7 and 8, is a layer or part of a channel structure CH, which comprises channels of the selected memory block. Because the channel structure CH is a solid, heat generated in the heating layer portion of the channel structure CH is conducted throughout the channel structure as well as the memory block. When sufficient heat is generated by a heating current, the generated heat causes electrons trapped in memory cells in the selected memory block to be freed or released, which improves the memory block's reliability.

In the above-described embodiment, it has been described that the control logic 300 controls the peripheral circuit 200 to perform the detrap operation, based on a number of program/erase operations of a memory block. As stated above, in some embodiments, a detrap operation may be performed when the number of program/erase operations exceeds a predetermined or "set" number, the value of which is a design choice and therefore chosen by a "user." In other embodiments, a detrap operation may be performed when the number of program/erase operations is equal to a pre-determined, set number. However, in another embodiment, the control logic 300 may control the peripheral circuit 200 to perform the detrap operation after an erase operation of a selected memory block when a number of memory cells in which a program fail of the selected memory block occurs, i.e., a program fail bit number exceeds a set bit number. For example, the control logic 300 may receive a program fail bit number from the pass/fail check circuit 200, and compare the received program fail bit number with the set bit number. When it is determined that a program fail bit number of a selected memory block on which a program operation is performed exceeds the set bit number as a comparison result, the detrap operation controller 310 of the control logic 300 may control the peripheral circuit 200 to perform the detrap operation after an erase operation of the selected memory block.

Figure 3:
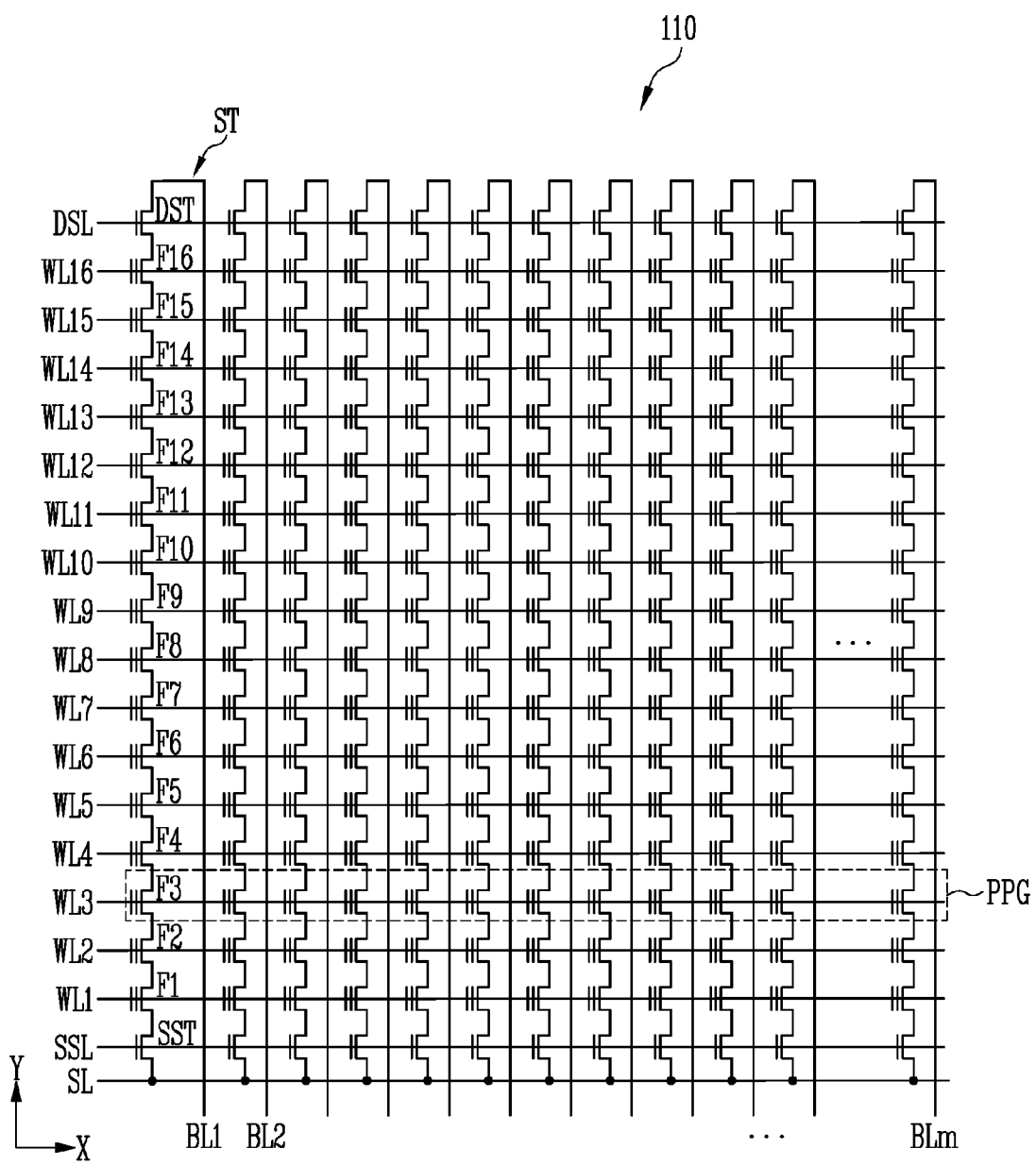
FIG. 3 is a diagram illustrating a memory block shown in FIG. 2.

FIG. 3 is a diagram illustrating the memory block shown in FIG. 2.

Referring to FIG. 3, in the memory block 110, a plurality of word lines arranged in parallel to one another may be connected between a first select line and a second select line. The first select line may be a source select line SSL, and the second select line may be a drain select line DSL. More specifically, the memory block 110 may include a plurality of strings ST connected between bit lines BL1 to BLm and a source line SL. The bit lines BL1 to BLm may be connected to the strings ST, respectively, and the source line SL may be commonly connected to the strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series between the source line SL and the first bit line BL1. At least one source select transistor SST and at least one drain select transistor DST may be included in one string ST, and memory cells of which number is greater than that of the memory cells F1 to F16 shown in the drawing may be included in the one string ST.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, gates of drain select transistors DST included in different strings ST may be connected to the drain select line DSL, and gates of memory cells F1 to F16 included in different strings ST may be connected to a plurality of word lines WL1 to WL16. A group of memory cells connected to the same word line among memory cells included in different strings ST may be referred as a page PPG. Therefore, pages PPG of which number corresponds to that of the word lines WL1 to WL16 may be included in the memory block 110.

Figure 4:
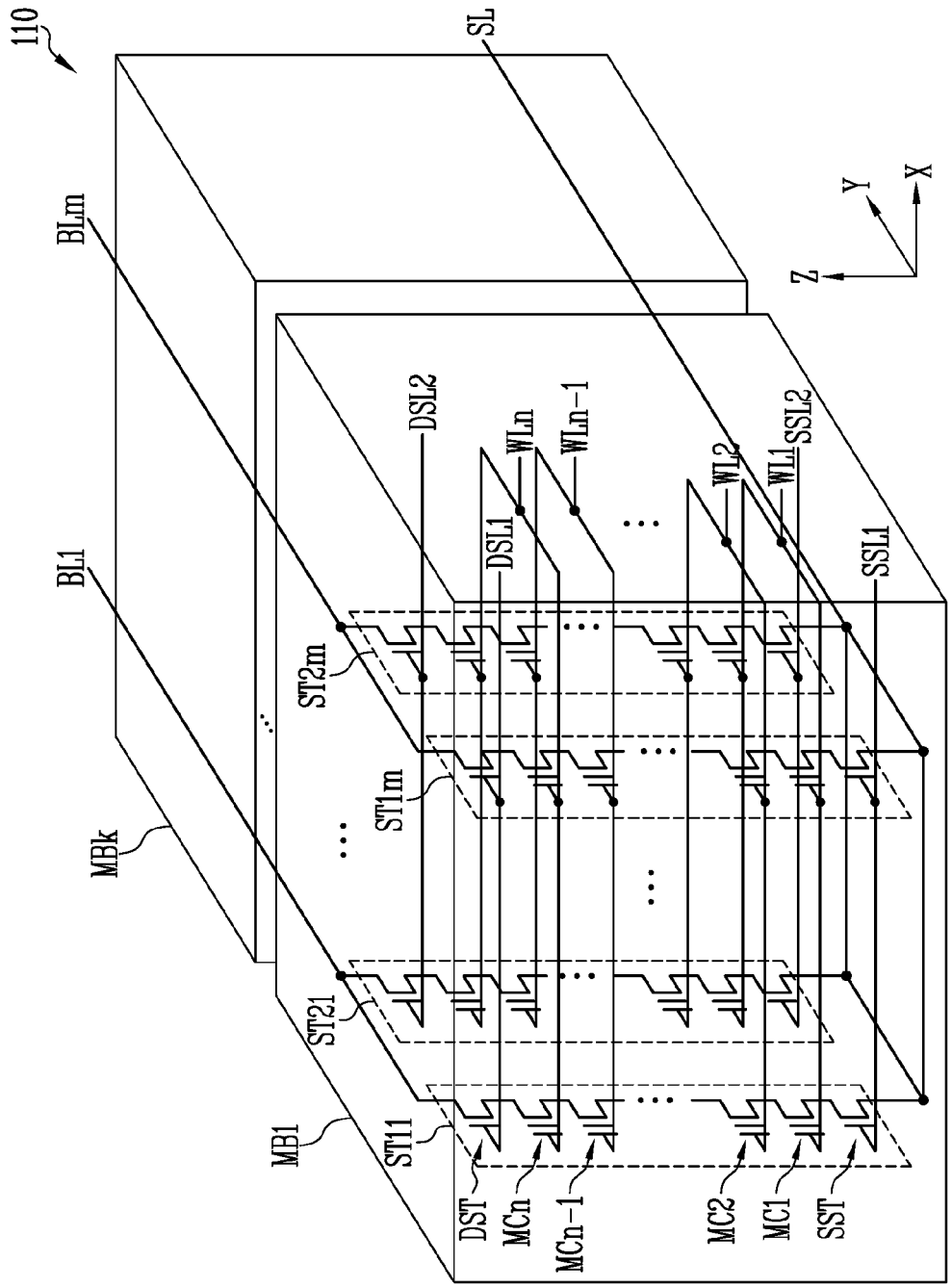
FIG. 4 is a diagram illustrating an embodiment of a three-dimensionally configured memory block.

FIG. 4 is a diagram illustrating an embodiment of a three-dimensionally configured memory block.

Referring to FIG. 4, the memory cell array 100 may include a plurality of memory blocks MB1 to MBk 110. The memory block 110 may include a plurality of strings ST11 to ST1m and ST21 to ST2m. In an embodiment, each of the plurality of strings ST11 to ST1m and ST21 to ST2m may be formed in an 'I' shape or a 'U' shape. In a first memory block MB1, m strings may be arranged in a row direction (X direction). Although a case where two strings are arranged in a column direction (Y direction) is illustrated in FIG. 4, this is for convenience of description, and three or more strings may be arranged in the column direction (Y direction).

Each of the plurality of strings ST11 to ST1m and ST21 to ST2m may include at least one source select transistor SST, first to nth memory cells MC1 to MCn, and at least one drain select transistor DST.

The source select transistor SST of each string may be connected between a source line SL and memory cells MC1 to MCn. Source select transistors of strings arranged on the same row may be connected to the same source select line. Source select transistors of strings ST11 to ST1m arranged on a first row may be connected to a first source select line SSL1. Source select transistors of strings ST21 to ST2m arranged on a second row may be connected to a second source select line SSL2. In another embodiment, the source select transistors of the strings ST11 to ST1m and ST21 to ST2m may be commonly connected to one source select line.

The first to nth memory cells MC1 to MCn of each string may be connected in series to each other between the source select transistor SST and the drain select transistor DST. Gates of the first to nth memory cells MC1 to MCn may be respectively connected to first to nth word lines WL1 to WLn.

In an embodiment, at least one of the first to nth memory cells MC1 to MCn may be used as a dummy memory cell. When the dummy memory cell is provided, a voltage or current of a corresponding string can be stably controlled. Accordingly, the reliability of data stored in the memory block 110 can be improved.

The drain select transistor DST of each string may be connected between a bit line and the memory cells MC1 to MCn. Drain select transistors DST of strings arranged in the row direction may be connected to a drain select line extending in the row direction. Drain select transistors DST of the strings ST11 to ST1m on the first row may be connected to a first drain select line DSL1. Drain select transistors DST of the strings ST21 to ST2m on the second row may be connected to a second drain select line DSL2.

Figure 5:
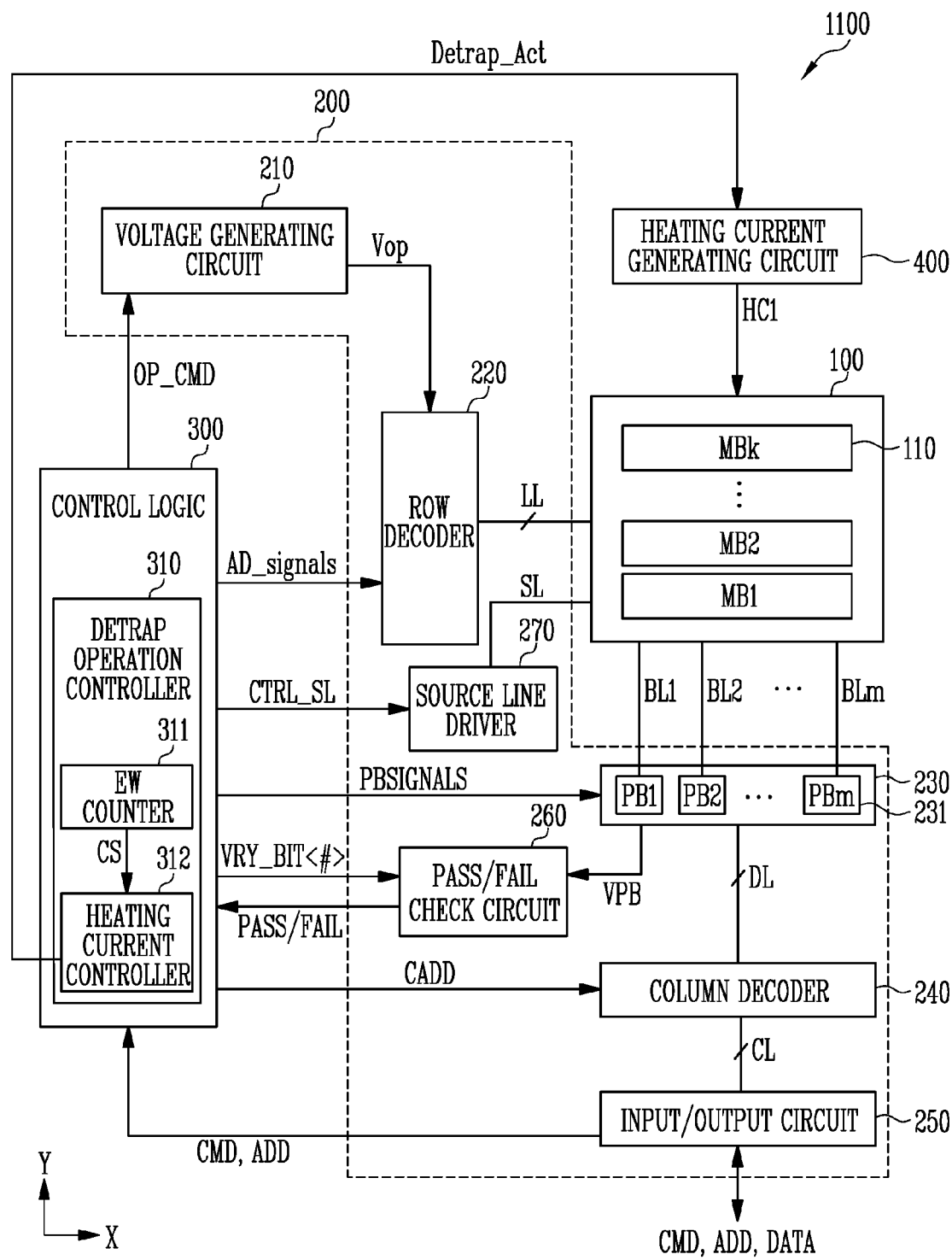
FIG. 5 is a diagram illustrating a second embodiment of the memory device shown in FIG. 1.

FIG. 5 is a diagram illustrating a second embodiment of the memory device shown in FIG. 1.

Referring to FIG. 5, the memory device 1100 may include a memory cell array 100 in which data is stored. The memory device 1100 may include a peripheral circuit 200 configured to perform a program operation for storing data in the memory cell array 100, a read operation for outputting stored data, and an erase operation for erasing stored data. The memory device 1100 may include a control logic 300 which controls the peripheral circuit 200 under the control of the memory controller (1200 shown in FIG. 1). The memory device 1100 may include a heating current generating circuit 400 for applying a first heating current HC1 to a selected memory block in a detrap operation.

The memory cell array 100 may include a plurality of memory blocks MB1 to MBk 110 (k is a positive integer). Local lines LL and the bit lines BL1 to BLm (m is a positive integer) may be connected to each of the memory blocks MB1 to MBk 110. For example, the local lines LL may include a first select line, a second select line, and a plurality of word lines arranged between the first and second select lines. Also, the local lines LL may include dummy lines arranged between the first select line and the word lines and between the second select line and the word lines. The first select line may be a source select line, and the second select line may be a drain select line. For example, the local lines LL may include word lines, drain and source select lines, and source lines SL. For example, the local lines LL may further include dummy lines. For example, the local lines LL may further include pipe lines. The local lines LL may be connected to each of the memory blocks MB1 to MBk 110, and the bit lines BL1 to BLm may be commonly connected to the memory blocks MB1 to MBk 110. The memory blocks MB1 to MBk 110 may be implemented in a two-dimensional or three-dimensional structure. For example, memory cells may be arranged in a direction parallel to a substrate in the memory blocks 110 having the two-dimensional structure. For example, memory cells may be stacked in a direction vertical to a substrate in the memory blocks 110 having the three-dimensional structure.

The peripheral circuit 200 may be configured to perform program, read, and erase operations of a selected memory block 110 under the control of the control logic 300. For example, the peripheral circuit 200 may include a voltage generating circuit 210, a row decoder 220, a page buffer group 230, a column decoder 240, an input/output circuit 250, a pass/fail check circuit 260, and a source line driver 270.

The voltage generating circuit 210 may generate various operating voltages Vop used for program, read, and erase operations in response to an operation signal OP_CMD.

The row decoder 220 may transfer the operating voltages Vop to the local lines LL connected to the selected memory block 110 in response to row decoder control signals AD_signals. For example, in a program operation, the row decoder 220 may apply a program operation voltage generated by the voltage generating circuit 210 to word lines of the selected memory block in response to the row decoder control signals AD_signals. Also, in a read operation, the row decoder 220 may apply a read operation voltage generated by the voltage generating circuit 210 to the word lines of the selected memory block in response to the row decoder control signals AD_signals.

The page buffer group 230 may include a plurality of page buffers PB1 to PBm 231 connected to the bit lines BL1 to BLm. The page buffers PB1 to PBm 231 may be operated in response to page buffer control signals PBSIGNALS. For example, in a program operation, the page buffers PB1 to PBm 231 may temporarily store data to be programmed and control a potential level of the bit lines BL1 to BLm, based on the temporarily stored data to be programmed.

The column decoder 240 may transfer data between the input/output circuit 250 and the page buffer group 230 in response to a column address CADD. For example, the column decoder 240 may exchange data with the page buffers 231 through data lines DL, or exchange data with the input/output circuit 250 through column lines CL.

The input/output circuit 250 may transfer a command CMD and an address ADD, which are transferred from the memory controller (1200 shown in FIG. 1), to the control logic 300, or exchange data DATA with the column decoder 240.

In a program verify operation, the pass/fail check circuit 260 may generate a reference current in response to an allow bit VRY_BIT<#>, and output a pass signal PASS or a fail signal FAIL by comparing a sensing voltage VPB received from the page buffer group 230 with a reference voltage generated by the reference current. The sensing voltage VPB may be a voltage controlled based on a number of memory cells determined as a pass in the program verify operation. Also, the pass/fail check circuit 260 may generate a program fail bit number by counting a number of memory cells determined as a fail, based on a result of the program verify operation, and transmit the program fail bit number to the control logic 300.

The source line driver 270 may be connected to a memory cell included in the memory cell array 100 through the source line SL, and control a voltage applied to the source line SL. The source line driver 270 may receive a source line control signal CTRL_SL from the control logic 300, and control a source line voltage applied to the source line SL, based on the source line control signal CTRL_SL.

The control logic 300 may control the peripheral circuit 200 by outputting the operation signal OP_CMD, the row decoder control signals AD_signals, the page buffer control signals PBSIGNALS, and the allow bit VRY_BIT<#> in response to the command CMD and the address ADD.

The control logic 300 may include a detrap operation controller 310. The detrap operation controller 310 may count a program/erase operation number of each of the plurality of memory blocks MB1 to MBk 110 included in the memory cell array 100, and control the heating current generating circuit 400 to perform a detrap operation on a memory block of which program/erase operation number exceeds a set number among the plurality of memory blocks MB1 to MBk 110.

The detrap operation controller 310 may include an EW counter 311 and a heating current controller 312.

The EW counter 311 may count a program/erase operation number of each of the plurality of memory blocks MB1 to MBk 110 included in the memory cell array 100, and compare the counted program/erase operation number of each of the plurality of memory blocks MB1 to MBk 110 with a set number. The EW counter 311 may generate and output a counting signal CS including information on a memory block of which program/erase operation number exceeds the set number among the plurality of memory blocks MB1 to MBk 110.

The heating current controller 312 may determine whether any memory block of which program/erase operation number exceeds the set number exists, based on the counting signal CS, thereby determining whether the detrap operation is to be performed. For example, when it is determined that a memory block of which program/erase operation number exceeds the set number exists, based on the counting signal CS, the heating current controller 312 may generate and output detrap activation signal Detrap_Act. Also, when it is determined that a memory block of which program/erase operation number exceeds the set number exists, based on the counting signal CS, the heating current controller 312 may control the page buffer group 230 or the source line driver 270 to apply a second heating current to the bit lines BL1 to BLm or the source line SL, and control the row decoder 220 such that the second heating current applied to the bit lines BL1 to BLm or the source line SL is applied to channels of the memory block of which program/erase operation number exceeds the set number.

The heating current generating circuit 400 may generate the first heating current HC1 in response to the detrap activation signal Detrap_Act output from the control logic 300. In the detrap operation, the heating current generating circuit 400 may generate the first heating current HC1 and apply the first heating current HC1 to a selected memory block on which the detrap operation is to be performed among the plurality of memory blocks MB1 to MBk 110 included in the memory cell array 100.

In the detrap operation, heat is generated in a selected memory block of which program/erase operation number exceeds, or in some embodiments, is equal to the set number by the first heating current applied to a heating line included in the selected memory block. Heating current applied to channels of the selected memory block raises the cell temperature to a temperature at which electrons trapped in memory cells in the selected memory block may be supplied with enough heat energy to cause the trapped electrons' release from a channel.

In the above-described embodiment, it has been described that the control logic 300 controls the peripheral circuit 200 to perform the detrap operation, based on a program/erase number of a memory block. However, in another embodiment, the control logic 300 may control the peripheral circuit 200 to perform the detrap operation after an erase operation of a selected memory block when a number of memory cells in which a program fail of the selected memory block occurs, i.e., a program fail bit number exceeds a set bit number. For example, the control logic 300 may receive a program fail bit number from the pass/fail check circuit 200, and compare the received program fail bit number with the set bit number. When it is determined that a program fail bit number of a selected memory block on which a program operation is performed exceeds the set bit number as a comparison result, the detrap operation controller 310 of the control logic 300 may control the heating current generating circuit 400 and the peripheral circuit 200 to perform the detrap operation after an erase operation of the selected memory block.

Figure 6:
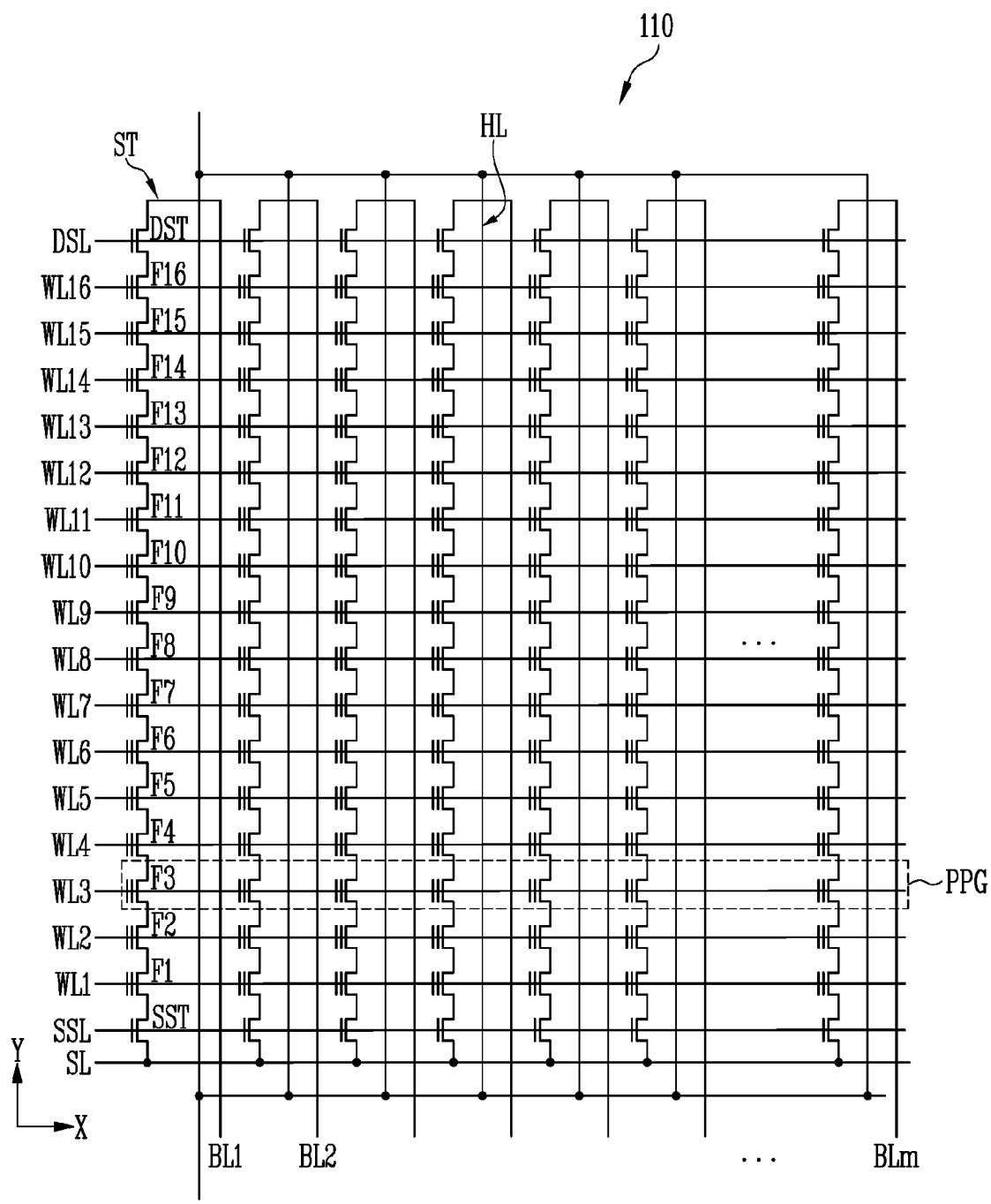
FIG. 6 is a diagram illustrating a memory block shown in FIG. 5.

FIG. 6 is a diagram illustrating the memory block shown in FIG. 5.

Referring to FIG. 6, in the memory block 110, a plurality of word lines arranged in parallel to one another may be connected between a first select line and a second select line. The first select line may be a source select line SSL, and the second select line may be a drain select line DSL. More specifically, the memory block 110 may include a plurality of strings ST connected between bit lines BL1 to BLm and a source line SL. The bit lines BL1 to BLm may be connected to the strings ST, respectively, and the source line SL may be commonly connected to the strings ST. Each of the plurality of strings ST may include a heating line HL. A first heating current is applied to the heating line HL in a detrap operation. The heating line HL may be disposed in parallel to a channel of each of the plurality of strings ST. The strings ST may be configured identically to one another, and therefore, a string ST connected to a first bit line BL1 will be described in detail as an example.

The string ST may include a source select transistor SST, a plurality of memory cells F1 to F16, and a drain select transistor DST, which are connected in series between the source line SL and the first bit line BL1. At least one source select transistor SST and at least one drain select transistor DST may be included in one string ST, and memory cells of which number is greater than that of the memory cells F1 to F16 shown in the drawing may be included in the one string ST. The heating line HL may be disposed under a channel of a source select transistor SST, a plurality of memory cells F1 to F16, and a drain select transistor DST, which are included in one string ST. The heating line HL, which as shown in FIG. 8 is actually layer 116 of the channel structure CH, may be disposed parallel to a direction in which the source select transistor SST, the plurality of memory cells F1 to F16, and the drain select transistor DST are connected in series.

A source of the source select transistor SST may be connected to the source line SL, and a drain of the drain select transistor DST may be connected to the first bit line BL1. The memory cells F1 to F16 may be connected in series between the source select transistor SST and the drain select transistor DST. Gates of source select transistors SST included in different strings ST may be connected to the source select line SSL, gates of drain select transistors DST included in different strings ST may be connected to the drain select line DSL, and gates of memory cells F1 to F16 included in different strings ST may be connected to a plurality of word lines WL1 to WL16. A group of memory cells connected to the same word line among memory cells included in different strings ST may be referred as a page PPG. Therefore, pages PPG of which number corresponds to that of the word lines WL1 to WL16 may be included in the memory block 110.

FIG. 7 is a perspective view illustrating an internal structure of strings included in the memory block shown in FIG. 5.

Referring to FIG. 7, the memory block 110 may include gate stack structures GST isolated from each other by a slit SI and channel structures CH penetrating each of the gate stack structures GST.

The slit SI may be filled with a vertical structure VS. In an embodiment, the vertical structure VS may include an insulating material.

Each of the gate stack structures GST may include interlayer insulating layers ILD and gate electrodes GA, which are alternately stacked in one direction. The gate electrodes GA correspond to the drain select line DSL, the plurality of word lines WL1 to WL16, and the source select line SSL, which are shown in FIG. 6.

Hereinafter, the direction in which the interlayer insulating layers ILD and the gate electrodes GA are alternately stacked is designated as a stacked direction. Each of the channel structures CH corresponds to any one of the plurality of strings ST shown in FIG. 4. The channel structure CH may extend in the stacked direction, and be surrounded by the gate electrodes GA.

Each of the channel structures CH may be connected to a plurality of bit lines BL1 to BL3 and a source line SL. For example, and as shown in FIG. 8, each of the channel structures CH may include a channel layer and a heating layer, both of which y extend "vertically" as the channel structures CH are drawn in FIG. 8, which is to say, the geometric central axis of the channel structures CH, which is not shown but inherently exists in those channel structures CH depicted in FIG. 8, are orthogonal or at least substantially orthogonal to the substantially planar gate layers GST. "Vertical" and "vertically" should therefore be construed as referring to a substantially orthogonal orientation of the channel structures CH relative to the substantially planar gate layers GST through which those channel structures CH extend. Their actual orientation is not necessarily vertical, i.e., orthogonal relative to the horizon.

The channel layer may be connected to the plurality of bit lines BL1 to BL3 and the source line SL. The heating layer may be a structure such as the structure identified by reference numeral 116 in FIG. 8. In FIG. 6, however, the heating layer HL, is represented by the heating line HL, an uppermost end portion or a lowermost end portion of the heating layer, HL may be connected to a line to which the first heating current HC1 generated by the heating current generating circuit 400 shown in FIG. 5 is supplied. When the uppermost end portion of the heating layer is connected to the line to which the first heating current HC1 is supplied, the lowermost end portion of the heating layer may be connected to a ground line VSS. In another embodiment, the lowermost end portion of the heating layer is connected to the line to which the first heating current HC1 is supplied, the uppermost end portion of the heating layer may be connected to the ground line VSS.

FIG. 8 is an enlarged sectional view of area X shown in FIG. 7.

The channel structure CH may include a blocking insulating layer 111, a charge storage layer 112, a tunnel insulating layer 112, a channel layer 114, an insulating layer 115, a heating layer 116, and a core insulating layer 117, which extending in a vertical direction.

The blocking insulating layer 111 may surrounds a sidewall of the charge storage layer 112. The blocking insulating layer 111 may include an oxide layer capable of blocking charges.

The charge storage layer 112 may surround a sidewall of the tunnel insulating layer 113. The charge storage layer 112 may be formed of a material layer capable of storing data changed using Fowler-Nordheim tunneling. In an embodiment, the charge storage layer 112 may be formed of a charge trap nitride layer.

The tunnel insulating layer 113 may surround a sidewall of the channel layer 114. The tunnel insulating layer 113 may be formed of a silicon oxide layer through which charges can tunnel.

The channel layer 114 may surround a sidewall of the insulating layer 115. The channel layer 114 may be used as a channel region of a string. The channel layer 114 may include a semiconductor layer. In an embodiment, the channel layer 114 may include silicon.

The insulating layer 115 may surround the heating layer 116. The insulating layer 115 may be disposed at an interface between the channel layer 114 and the heating layer 116 to electrically isolate the channel layer 114 and the heating layer 116 from each other.

The heating layer 116 may partially or completely surround the core insulating layer 117. The heating layer 116 may be connected to the line to which the first heating current HC1 generated by the heating current generating circuit 400 shown in FIG. 5 and the ground line VSS as shown in FIG. 7. When heating current is applied to the heating layer 116, the heating layer's temperature will increase and as a result, heat energy generated in the heating layer is thermally conducted to the entire channel structure CH, based on the amount of a first heating current HC1 applied to the heating layer HL, in a detrap operation. The heating layer 116 may be preferably formed as a thermal resistance layer having a comparatively high D.C. resistance, i.e., having a D.C. resistance greater than other channel structure CH layers, examples of which include but are not limited to metal alloy (e.g., a Ni—Cr layer or a Fe—Cr layer), a doped silicon layer, a doped germanium layer, or a doped carbon layer.

Figure 9:
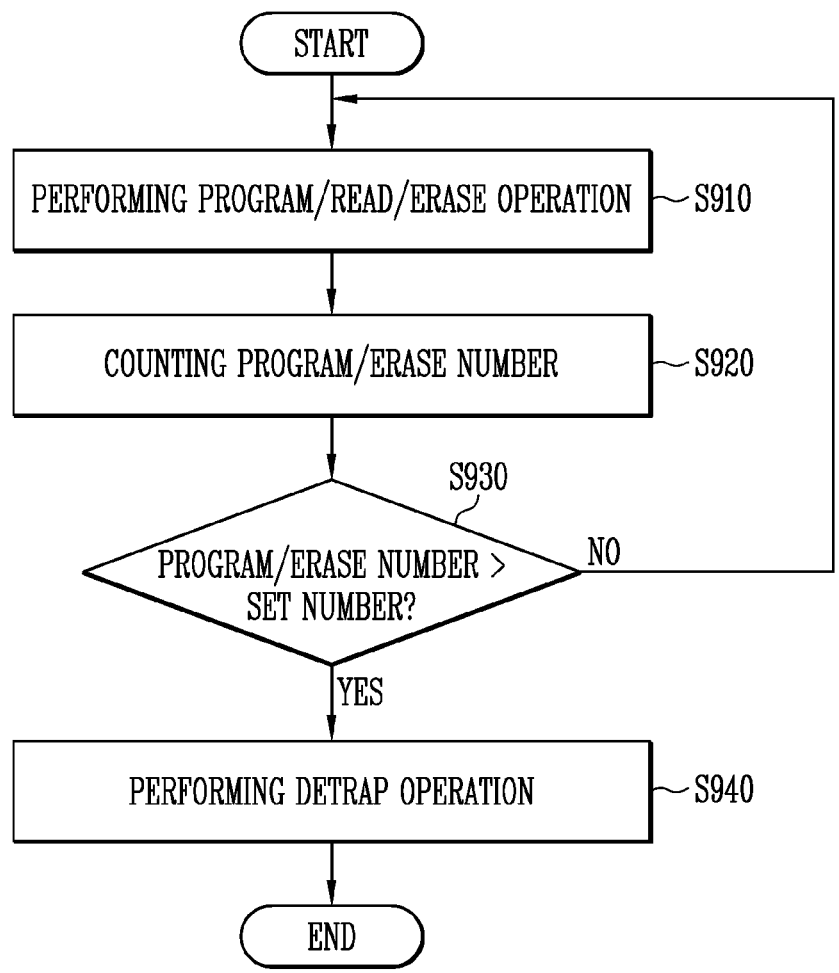
FIG. 9 is a flowchart illustrating an operation of the memory device in accordance with an embodiment of the present disclosure.

FIG. 9 is a flowchart illustrating an operation of the memory device in accordance with an embodiment of the present disclosure.

An operation of the memory device in accordance with the first embodiment of the present disclosure will be described as follows with reference to FIGS. 2 to 4 and 9.

In step S910, the memory device 1100 performs a general operation, e.g., a program operation, a read operation, or an erase operation on a selected memory block (e.g., MB1) among the plurality of memory blocks MB1 to MBk.

In step S920, the control logic 300 counts a program/erase number of the selected memory block MB1 on which the program operation, the read operation, or the erase operation is completed. For example, the EW counter 311 of the detrap operation controller 310 may count the program/erase operation number of the selected memory block MB1.

In step S930, the control logic 300 determines whether the counted program/erase number of the selected memory block MB1 exceeds a set number. For example, the EW counter 311 of the detrap operation controller 310 may compare the counted program/erase number of the selected memory block MB1 with the set number, and generate and output a counting signal CS, based on a comparison result. The heating current controller 312 of the detrap operation controller 310 may determine whether the counted program/erase number of the selected memory block MB1 exceeds the set number, based on the counting signal CS.

As a determination result of the above-described step S930, when it is determined that the counted program/erase number of the selected memory block MB1 is equal to or smaller than the set number, the control logic 300 may control the peripheral circuit 200 to perform the above-described steps from the step S910 by selecting a memory block on which the general operation is to be performed among the plurality of memory blocks MB1 to MBk.

As a determination result of the above-described step S930, when it is determined that the counted program/erase number of the selected memory block MB1 exceeds the set number, in step S940, the control logic 300 may control the peripheral circuit 200 to perform a detrap operation.

For example, the heating current controller 312 of the detrap operation controller 310 may control the page buffer group 230 or the source line driver 270 to apply a heating current to the bit lines BL1 to BLm or the source line SL, and control the row decoder 220 such that the heating current applied to the bit lines BL1 to BLm or the source line SL is applied to channels of a memory block of which program/erase number exceeds the set number.

In the detrap operation, a heating current is applied to a heating layer of the selected memory block MB1 through the bit lines BL1 to BLm or the source line SL, and heat is generated in a channel by the applied heating current. Electrons "trapped" in a tunnel insulating layer of memory cells included in the selected memory block MB1 or an interface between the tunnel insulating layer and a charge storage layer may be supplied with thermal energy by heat generated in the channel, which causes trapped electrons to be released or detrapped.

In the above-described embodiment, it has been described that the detrap operation is performed when the counted program/erase number of the selected memory block exceeds the set number. However, the embodiment of the present disclosure is not limited thereto. In accordance with another embodiment, the above-described detrap operation may be performed when a number of memory cells in which a fail occurs in a program operation of the selected memory block exceeds a set number.

An operation of the memory device in accordance with the second embodiment of the present disclosure will be described as follows with reference to FIGS. 5 to 10.

In step S910, the memory device 1100 performs a general operation, e.g., a program operation, a read operation, or an erase operation on a selected memory block (e.g., MB1) among the plurality of memory blocks MB1 to MBk.

In step S920, the control logic 300 counts a program/erase number of the selected memory block MB1 on which the program operation, the read operation, or the erase operation is completed. For example, the EW counter 311 of the detrap operation controller 310 may count the program/erase operation number of the selected memory block MB1.

In step S930, the control logic 300 determines whether the counted program/erase number of the selected memory block MB1 exceeds a set number. For example, the EW counter 311 of the detrap operation controller 310 may compare the counted program/erase number of the selected memory block MB1 with the set number, and generate and output a counting signal CS, based on a comparison result. The heating current controller 312 of the detrap operation controller 310 may determine whether the counted program/erase number of the selected memory block MB1 exceeds the set number, based on the counting signal CS.

As a determination result of the above-described step S930, when it is determined that the counted program/erase number of the selected memory block MB1 is equal to or smaller than the set number, the control logic 300 may control the peripheral circuit 200 to perform the above-described steps from the step S910 by selecting a memory block on which the general operation is to be performed among the plurality of memory blocks MB1 to MBk.

As a determination result of the above-described step S930, when it is determined that the counted program/erase number of the selected memory block MB1 exceeds the set number, in step S940, the control logic 300 may control the peripheral circuit 200 and the heating current generating circuit 400 to perform a detrap operation.

For example, the heating current controller 312 of the detrap operation controller 310 generates and outputs a detrap activation signal Detrap_Act. Also, the heating current controller 312 may control the page buffer group 230 or the source line driver 270 to apply a heating current to the bit lines BL1 to BLm or the source line SL, and control the row decoder 220 such that the heating current applied to the bit lines BL1 to BLm or the source line SL is applied to channels of a memory block of which program/erase number exceeds the set number.

In the detrap operation, the heating current generating circuit 400 generates a first heating current HC1 in response to the detrap activation signal Detrap_Act, and applies the first heating current HC1 to a heating line HL of the selected memory block MB1. In addition, the page buffer group 230 or the source line driver 270 generates a second heating current HC2, and the row decoder 220 applies the second heating current HC2 to a channel of the selected memory block MB1.

Figure 10:
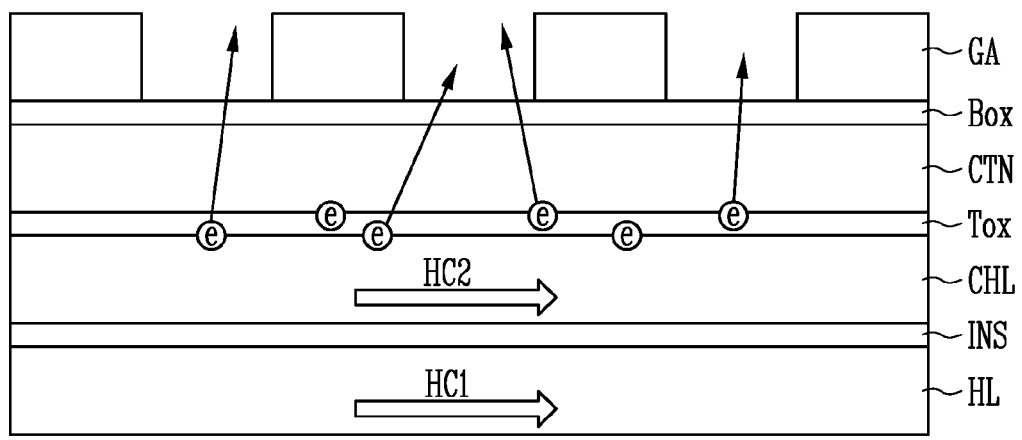
FIG. 10 is a sectional view of memory cells, illustrating a detrap operation.

FIG. 10 is a sectional view of memory cells, illustrating a detrap operation.

Referring to FIG. 10, in the detrap operation, heat may be generated by a first heating current HC1 applied to a heating line HL and a second heating current HC2 applied to a channel layer CHL. An insulating layer INS may be disposed between the heating line HL and the channel layer CHL to allow the heating line HL and the channel layer CHL to be electrically spaced apart from each other. Electrons @ trapped in a tunnel insulating layer Tox of memory cells and an interface between the tunnel insulating layer Tox and a charge storage layer CTN may be supplied with thermal energy by heat generated within a channel structure CH, which causes their release or which as least assists their release from the insulating layer TOX. A blocking insulating layer Box and a gate layer GA for word lines may be disposed on the top of the charge storage layer CTN.

In the above-described embodiment, it has been described that the detrap operation is performed when the counted program/erase number of the selected memory block exceeds the set number. However, the embodiment of the present disclosure is not limited thereto. In accordance with another embodiment, when a number of memory cells in which a fail occurs in a program operation of the selected memory block exceeds a set number, the above-described detrap operation may be performed.

Figure 11:
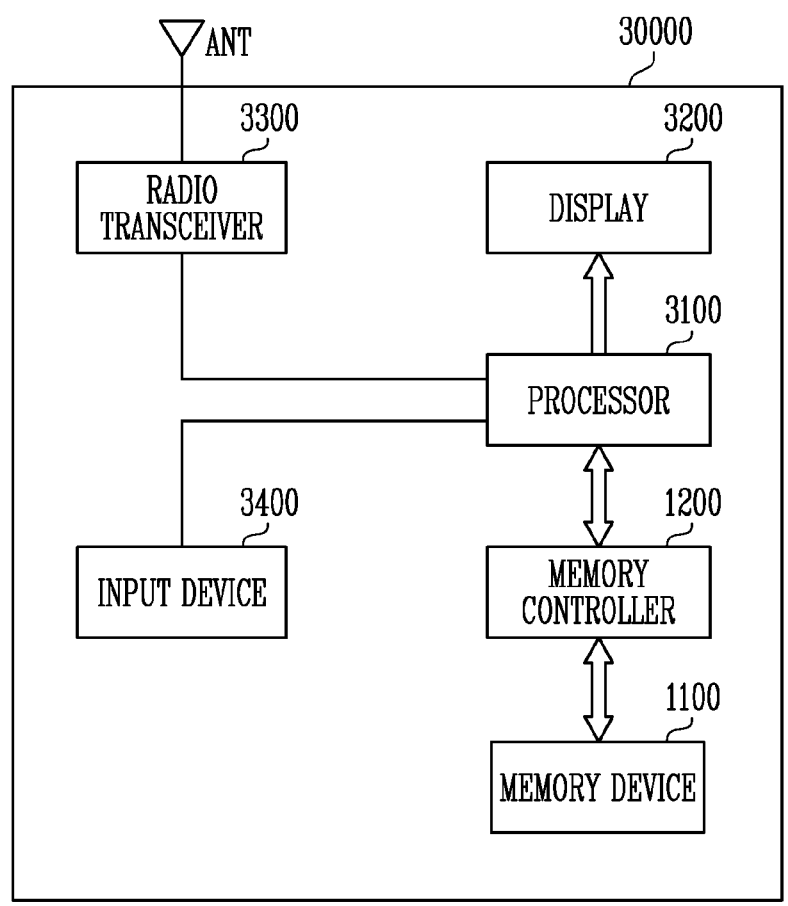
FIG. 11 is a diagram illustrating another embodiment of the memory system.

FIG. 11 is a diagram illustrating another embodiment of the memory system.

Referring to FIG. 11, the memory system 30000 may be implemented as a cellular phone, a smart phone, a tablet PC, a personal digital assistant (PDA), or a wireless communication device. The memory system 30000 may include a memory device 1100 and a memory controller 1200 capable of controlling an operation of the memory device 1100. The memory controller 1200 may control a data access operation of the memory device 1100, e.g., a program operation, an erase operation, a read operation, or the like under the control of a processor 3100.

Data programmed in the memory device 1100 may be output through a display 3200 under the control of the memory controller 1200.

A radio transceiver 3300 may transmit/receive radio signals through an antenna ANT For example, the radio transceiver 3300 may change a radio signal received through the antenna ANT into a signal that can be processed by the processor 3100. Therefore, the processor 3100 may process a signal output from the radio transceiver 3300 and transmit the processed signal to the memory controller 1200 or the display 3200. The memory controller 1200 may transmit the signal processed by the processor 3100 to the memory device 1100. Also, the radio transceiver 3300 may change a signal output from the processor 3100 into a radio signal, and output the changed radio signal to an external device through the antenna ANT. An input device 3400 is a device capable of inputting a control signal for controlling an operation of the processor 3100 or data to be processed by the processor 3100, and may be implemented as a pointing device such as a touch pad or a computer mount, a keypad, or a keyboard. The processor 3100 may control an operation of the display 3200 such that data output from the memory controller 1200, data output from the radio transceiver 3300, or data output from the input device 3400 can be output through the display 3200.

In some embodiments, the memory controller 1200 capable of controlling an operation of the memory device 1100 may be implemented as a part of the processor 3100, or be implemented as a chip separate from the processor 3100. In addition, the memory controller 1200 may be implemented as an example of the memory controller 1200 shown in FIG. 1, and the memory device 1100 may be implemented as an example of the memory device 1100 shown in FIG. 2.

Figure 12:
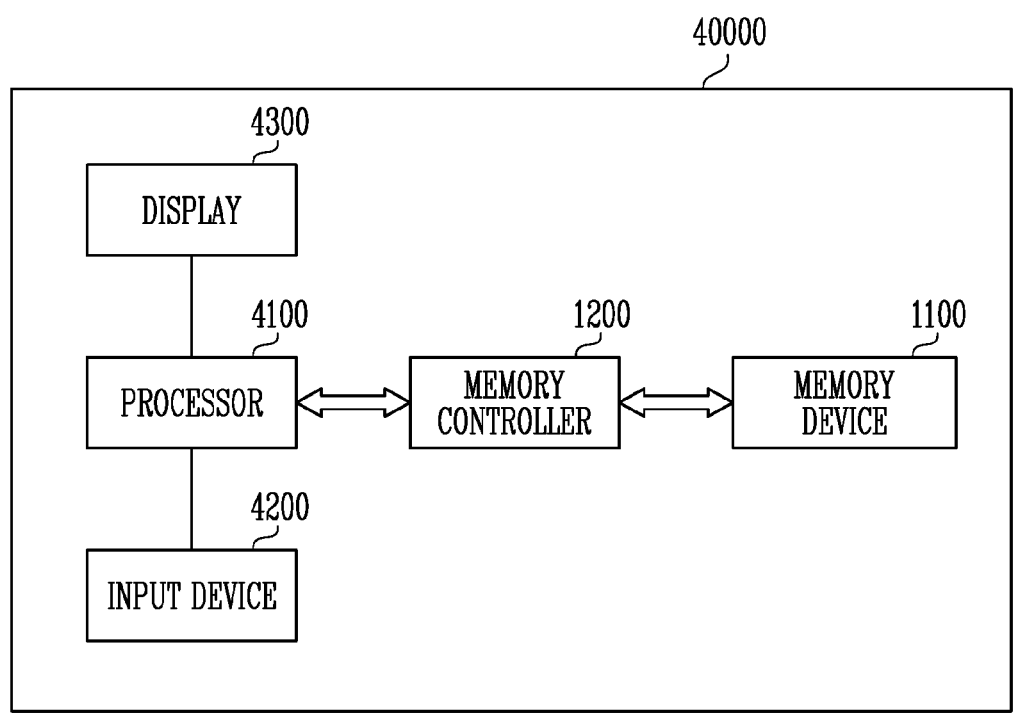
FIG. 12 is a diagram illustrating another embodiment of the memory system.

FIG. 12 is a diagram illustrating another embodiment of the memory system.

Referring to FIG. 12, the memory system 40000 may be implemented as a personal computer (PC), a tablet PC, a net-book, an e-reader, a personal digital assistant (PDA), a portable multi-media player (PMP), an MP3 player, or an MP4 player.

The memory system 40000 may include a memory device 1100 and a memory controller 1200 capable of controlling a data processing operation of the memory device 1100.

A processor 4100 may output data stored in the memory device 1100 through a display 4300 according to data input through an input device 4200. For example, the input device 4200 may be implemented as a pointing device such as a touch pad or a computer mouse, a keypad, or a keyboard.

The processor 4100 may control overall operations of the memory system 40000, and control an operation of the memory controller 1200. In some embodiments, the memory controller 1200 capable of controlling an operation of the memory device 1100 may be implemented as a part of the processor 4100, or be implemented as a chip separate from the processor 4100. In addition, the memory controller 1200 may be implemented as an example of the memory controller 1200 shown in FIG. 1, and the memory device 1100 may be implemented as an example of the memory device 1100 shown in FIG. 2.

Figure 13:
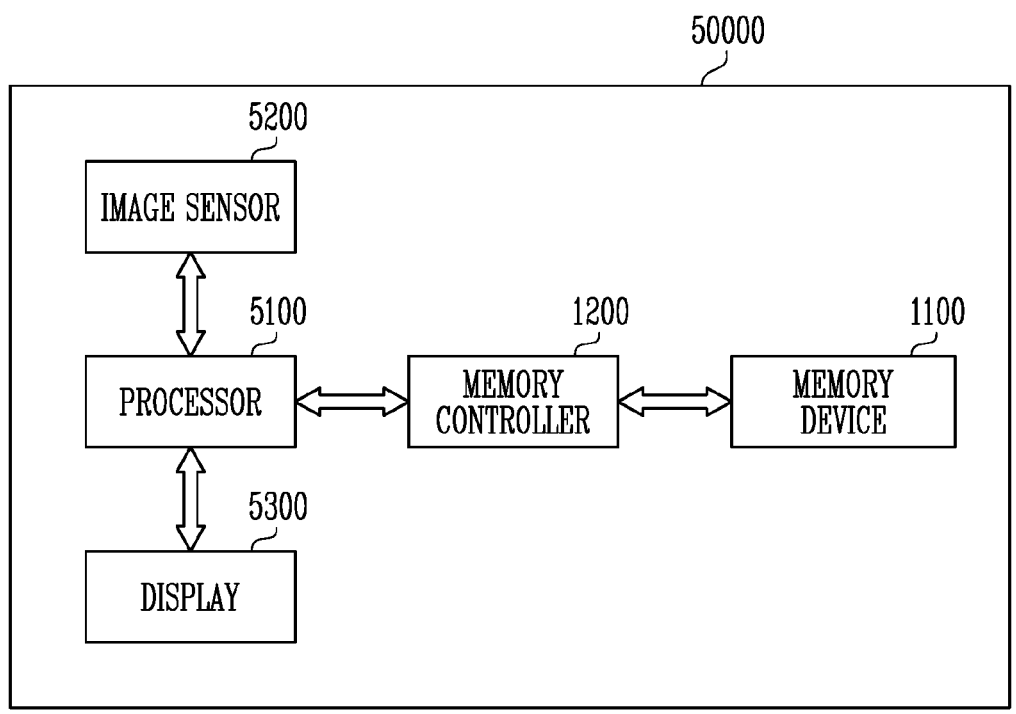
FIG. 13 is a diagram illustrating another embodiment of the memory system.

FIG. 13 is a diagram illustrating another embodiment of the memory system.

Referring to FIG. 13, the memory system 50000 may be implemented as an image processing device, e.g., a digital camera, a mobile terminal having a digital camera attached thereto, a smart phone having a digital camera attached thereto, or a tablet PC having a digital camera attached thereto.

The memory system 50000 may include a memory device 1100 and a memory controller 1200 capable of controlling a data processing operation of the memory device 1100, e.g., a program operation, an erase operation, or a read operation.

An image sensor 5200 of the memory system 50000 may convert an optical image into digital signals, and the converted digital signals may be transmitted to a processor 5100 or the memory controller 1200. Under the control of the processor 5100, the converted digital signals may be output through a display 5300, or be stored in the memory device 1100 through the memory controller 1200. In addition, data stored in the memory device 1100 may be output through the display 5300 under the control of the processor 5100 or the memory controller 1200.

In some embodiments, the memory controller 1200 capable of controlling an operation of the memory device 1100 may be implemented as a part of the processor 5100, or be implemented as a chip separate from the processor 5100. In addition, the memory controller 1200 may be implemented as an example of the memory controller 1200 shown in FIG. 1, and the memory device 1100 may be implemented as an example of the memory device 1100 shown in FIG. 2.

Figure 14:
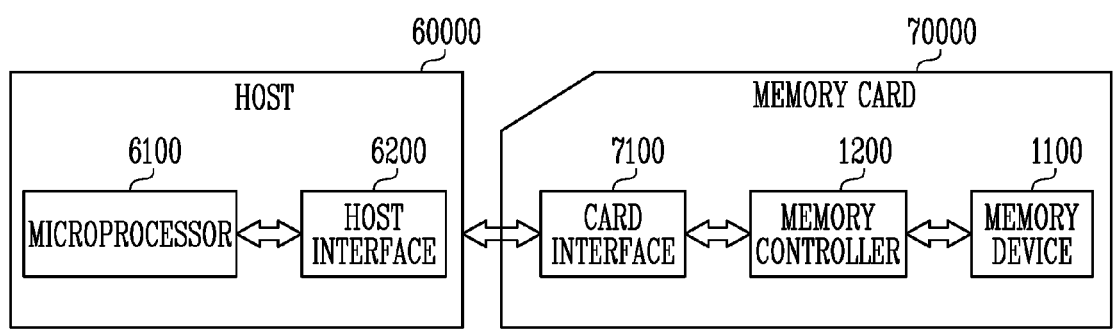
FIG. 14 is a diagram illustrating another embodiment of the memory system.

FIG. 14 is a diagram illustrating another embodiment of the memory system.

Referring to FIG. 14, the memory system 70000 may be implemented as a memory card or a smart card. The memory system 70000 may include a memory device 1100, a memory controller 1200, and a card interface 7100.

The memory controller 1200 may control data exchange between the memory device 1100 and the card interface 7100. In some embodiments, the card interface 7100 may be a secure digital (SD) card interface or a multi-media card (MMC) interface, but the present disclosure is not limited thereto. In addition, the memory controller 1200 may be implemented as an example of the memory controller 1200 shown in FIG. 1, and the memory device 1100 may be implemented as an example of the memory device 1100 shown in FIG. 2.

The card interface 7100 may interface data exchange between a host 60000 and the memory controller 1200 according to a protocol of the host 60000. In some embodiments, the card interface 7100 may support a universal serial bus (USB) protocol and an inter-chip (IC)-USB protocol. The card interface 7100 may mean hardware capable of supporting a protocol used by the host 60000, software embedded in the hardware, or a signal transmission scheme.

When the memory system 70000 is connected to a host interface 6200 of the host 60000 such as a PC, a tablet PC, a digital camera, a digital audio player, a cellular phone, console video game hardware, or a digital set-top box, the host interface 6200 may perform data communication with the memory device 1100 through the card interface 7100 and the memory controller 1200 under the control of a microprocessor 6100.

In accordance with the present disclosure, after a program/erase operation of the memory device is performed a set number of times, abnormal electrons trapped in memory cells are removed, so that a retention characteristic of the memory cells can improved.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein.

What is claimed is:

1. A memory device comprising:
a plurality of memory blocks each including a plurality of strings;
a peripheral circuit configured to perform a program operation, a read operation, and an erase operation on a selected memory block among the plurality of memory blocks; and
control logic, coupled to the peripheral circuit and configured to count a number of program/erase operations of the plurality of memory blocks, and control the peripheral circuit to perform a detrap operation of the selected memory block when the number of program/erase operations of the selected memory block exceeds a set number,
wherein the peripheral circuit is additionally configured to apply a heating current to only one layer among a plurality of layers of a channel of each of the plurality of strings included in the selected memory block in the detrap operation.

2. The memory device of claim 1, wherein the peripheral circuit comprises a page buffer group connected to bit lines of the plurality of memory blocks, and
wherein the page buffer group is configured to cause the application of the heating current to the bit lines in the detrap operation.

3. The memory device of claim 1, wherein the peripheral circuit comprises a source line driver connected to a source line of the plurality of memory blocks, and
wherein the source line driver is configured to cause the application of the heating current to the source line in the detrap operation.

4. The memory device of claim 1, wherein the control logic comprises a detrap operation controller configured to control the peripheral circuit in the detrap operation.

5. The memory device of claim 4, wherein the detrap operation controller includes:
an EW counter configured to count the number of program/erase operations of the plurality of memory blocks, compare the counted number of program/erase operations of the plurality of memory blocks with the set number, and generate and output a counting signal including information on a memory block of which the number of program/erase operations exceeds the set number; and a heating current controller configured to determine whether the detrap operation is to be performed, based on the counting signal, and control the peripheral circuit to generate the heating current in the detrap operation of the selected memory block and apply the heating current to the portion of the channel of each of the strings of the selected memory block.

6. The memory device of claim 1, wherein the control logic is coupled to the peripheral circuit and causes the peripheral circuit to perform the detrap operation of the selected memory block when a number of memory cells in which a program fail occurs in the program operation of the selected memory block exceeds a set number.

7. A method of operating a memory device, the method comprising:

performing a general operation of a selected memory block;

determining whether a number of program/erase operations of the selected memory block exceeds a predetermined set number; and in response to determining that the number of program/erase operations is greater than the predetermined set number, applying a predetermined heating current to only one layer among a plurality of layers of a channel of each of a plurality of memory strings included in the selected memory block.

8. The method of claim 7, wherein the heating current is applied to bit lines or a source line, connected to the plurality of memory strings of the selected memory block.

9. The method of claim 7, wherein, when the number of program/erase operations of the selected memory block is at least one of: being equal to or less than the set number, the general operation is performed by selecting a new memory block.

10. The method of claim 7, further comprising the step of applying the heating current when a number of memory cells in which a program fail occurs exceeds or is equal to a set number.

11. A memory device comprising:

a memory cell array including a plurality of memory blocks each including a plurality of strings;

a peripheral circuit configured to perform a program operation, a read operation, an erase operation, and perform a detrap operation on a selected memory block among the plurality of memory blocks;

a heating current generating circuit configured to apply a first heating current to only one layer among a plurality of layers of a channel of the selected memory block in the detrap operation; and control logic configured to count a number of program/erase operations of the selected memory block, and control the peripheral circuit and the heating current generating circuit to perform the detrap operation on the selected memory block when the number of program/erase operations exceeds a set number.

12. The memory device of claim 11, wherein each of the plurality of strings has a channel structure including a heating layer, a channel layer, a tunnel insulating layer, and a charge storage layer.

13. The memory device of claim 12, wherein the heating layer generates heat when the first heating current is provided to the heating layer.

14. The memory device of claim 11, wherein the peripheral circuit is configured to apply a second heating current to a channel of each of the plurality of strings included in the selected memory block in the detrap operation.

15. The memory device of claim 14, wherein the control logic comprises a detrap operation controller configured to control the heating current generating circuit and the peripheral circuit in the detrap operation.

16. The memory device of claim 15, wherein the detrap operation controller comprises:

an EW counter configured to count the number of program/erase operations of the selected memory block, and output a counting signal by comparing the counted number of program/erase operations of the selected memory block with the set number; and a heating current controller configured to determine whether the detrap operation is to be performed on the selected memory block, based on the counting signal, generate and output a detrap activation signal for controlling the heating current generating circuit to generate the first heating current in the detrap operation of the selected memory block, and control the peripheral circuit to generate the second heating current and apply the second heating current to the channel of each of the plurality of strings of the selected memory block.

17. The memory device of claim 11, wherein the peripheral circuit comprises:

a page buffer group connected to bit lines of the plurality of memory blocks; and a source line driver connected to a source line of the plurality of memory blocks, and wherein, during the detrap operation, the page buffer group applies a second heating current to the bit lines, or the source line driver applies the second heating current to the source line.

18. The memory device of claim 11, wherein the control logic is configured to cause the peripheral circuit to perform the detrap operation of the selected memory block when a number of memory cells in which a program fail occurs in the program operation of the selected memory block exceeds a set number.

19. A method of operating a memory device, the method comprising:

performing a general operation of a memory block including a plurality of strings, wherein each of the plurality of strings has a channel structure including a heating layer, a channel layer, a tunnel insulating layer, and a charge storage layer;

determining whether a number of program/erase operations of the memory block exceeds a predetermined set number; and performing a detrap operation by providing a heating current to only the heating layer of each of the plurality of strings included in the memory block in response to determining that the number of program/erase operations of the memory block exceeds the set number.

20. The method of claim 19, further comprising the step of performing the detrap operation when a number of memory cells in which a program fail occurs in a program operation as the general operation of the memory block equals or exceeds a predetermined set number.

* * * * *